May 1, 1923.
H. H. SEELEY
WINDSHIELD PIVOT CONSTRUCTION
Filed May 9, 1921
1,453,955
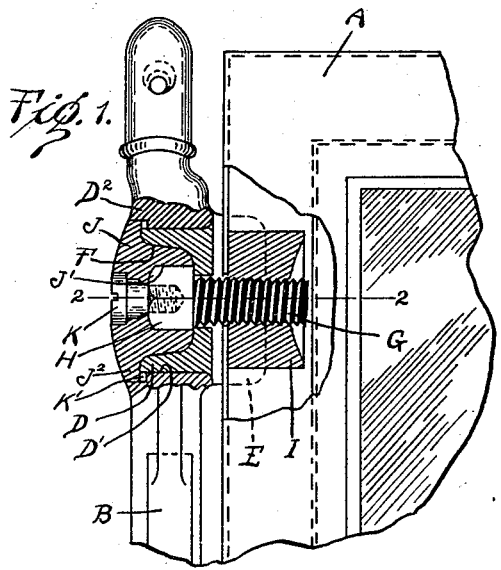
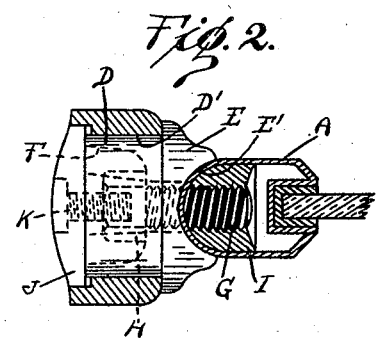
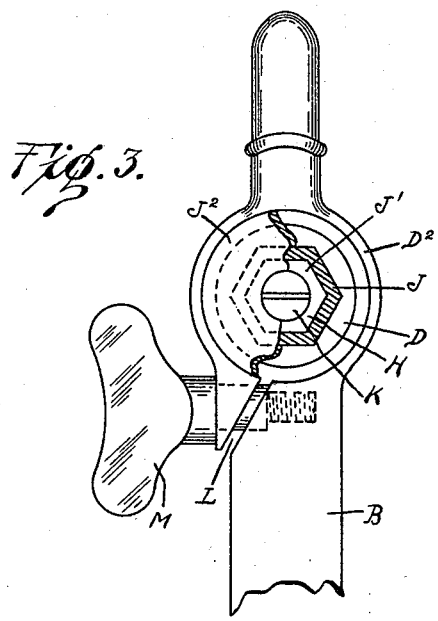
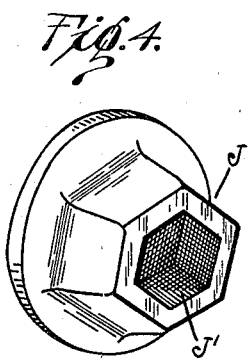
INVENTOR.
Halstead H. Seeley
BY
Whittemore, Hulbert, Whittemore, and Belknap
ATTORNEYS.

Patented May 1, 1923.

1,453,955

UNITED STATES PATENT OFFICE.

HALSTEAD H. SEELEY, OF DETROIT, MICHIGAN, ASSIGNOR TO MOTOR PRODUCTS CORPORATION, OF DETROIT, MICHIGAN, A CORPORATION OF NEW YORK.

WINDSHIELD-PIVOT CONSTRUCTION.

Application filed May 9, 1921. Serial No. 468,195.

*To all whom it may concern:*

Be it known that I, HALSTEAD H. SEELEY, a citizen of the United States of America, residing at Detroit, in the county of Wayne and State of Michigan, have invented certain new and useful Improvements in Windshield-Pivot Constructions, of which the following is a specification, reference being had therein to the accompanying drawings.

This invention relates to windshield pivot constructions, and the invention consists in the structural features and arrangement of parts hereinafter fully described and illustrated in the accompanying drawing, wherein:

Figure 1 is a vertical sectional view of the pivot construction showing fragmentary portions of the pivotal windshield and the standard supporting the same;

Figure 2 is a cross section on line 2—2 of Figure 1;

Figure 3 is an end view of the same;

Figure 4 is a perspective view of a finishing piece employed in the construction.

In these views, the reference character A designates the tubular sheet metal frame of a pivotal windshield section, and B is the supporting standard for said section. To the frame A there is secured a laterally projecting cylindrical pivot member D which is journaled in an opening D' forming in an enlarged bearing portion $D^2$ of the standard B. The pivot member D is integrally formed at one end with an enlarged head E which is semi-cylindrically channeled as indicated at E' to embrace the frame A. The other end of said pivot member is formed with a slightly flared hexagonal socket F. The pivot member is secured to the frame A by a bolt G having its hexagonal head H seated within the socket opening F, and having its shank entering the tubular frame member A of the windshield and engaging a filler I within said tubular member. Thus when the bolt G is screwed tightly into the filler I the pivot member D is firmly clamped against the frame A and is restrained against any tendency to rotation on its axis by the head E. A sufficient clearance is afforded between the head H of the bolt G and the wall of the socket F to permit engagement with said head of a suitable wrench for tightening the bolt. J designates the finishing piece which is engageable with the pivot member D and with the enlargement $D^2$ of the standard. Said finishing piece has the hexagonal central recess or socket J' adapted to snugly embrace the bolt head H, and the exterior surface of the recessed portion is also hexagonal and is tapered to fit snugly within the correspondingly shaped socket opening F. Said finishing piece is laterally flanged to cover the joint between the pivot member D and the enlargement $D^2$, and the outer face of said member J is convexed. To secure the member J in the described position there is employed a screw K having its head countersunk centrally in the member J and its shank axially threaded into the bolt head H. It is preferred to provide a slight clearance as indicated at K' between the flange $J^2$ of the member J and the enlargement $D^2$ so that there will be no appreciable friction arising between the member J and the standard.

As a provision for clamping the pivot member D in any desired position of rotative adjustment the bearing $D^2$ of the standard is split as indicated at L preferably at an angle to the vertical and at a point below said pivot member and a wing headed clamping screw M connects the portions of the bearing separated by the slit L and is adapted to draw said portions together to clamp the bearing upon the pivot member D.

It is to be noted that the member J in addition to imparting a finished appearance to the construction serves also to provide a lock for the bolt G preventing the same from working loose, and said member further provides a weather seal to prevent access of moisture to the pivot joint. By forming the wall of the hexagonal socket opening F with a slight flare and correspondingly tapering the hexagonal exterior face of the member J, said member may be wedged firmly by the screw K into the clearance space between the head H and member D so as to snugly fill said space and positively insure against any loosening of the bolt G.

What I claim as my invention is:

1. In a pivot construction, the combination with a pivotal member and a support therefor, of a pivot member carried by said pivotal member, a bolt securing the pivot member to the pivotal member, a finishing piece surrounding a portion of said bolt and concealing both said bolt and said pivot member, and a screw retaining said finishing piece engaging the head of said bolt.

2. In a pivot construction, the combination with a pivotal member and a support therefor, of a pivot member carried by the pivotal member and projecting laterally therefrom, the pivot member being formed with a flaring recess opening in the outer face of said member, a bolt securing the pivot member to the pivotal member having a polygonal head within said recess, a clearance space being formed between said head and the wall of said recess, and a member detachably secured to the head of said bolt having a portion filling said clearance space, having a polygonal interior face and a tapering exterior face conforming to those of the bolt head and of said recess in the pivot member.

3. In a windshield pivot construction, the combination with a windshield frame, of a pivot member carried by said frame and laterally projecting therefrom, said member having a head partially embracing the frame, a bolt axially engaging said pivot member and securing the same to the frame, and means detachably engaging the pivot member locking said bolt against rotation and concealing said pivot member and said bolt.

4. In a windshield pivot construction, the combination with a tubular windshield frame, of a pivot member laterally projecting from said frame, a filler within the frame opposite said pivot member, a bolt clamping said pivot member to the frame threaded into said filler member, and means non-rotatively and detachably engaging the head of said bolt and non-rotatively engaged with said pivot member.

5. In a windshield pivot construction, the combination with a tubular windshield frame, of a pivot member laterally projecting from said frame, a support for said frame in which said pivot member is journaled, a filler piece within the tubular frame opposite said pivot member, a bolt axially engaging said pivot member and threaded into said filler, the head of said bolt being recessed within said pivot member, a finishing piece having a portion engaging within said recess and locking said head against rotation, and a screw securing said finishing piece to the head of said bolt.

6. In a pivot construction, the combination with a pivotal member and a support therefor, of a pivot member carried by the pivotal member and having a flaring polygonal recess opening in the outer face of said member, a bolt securing the pivot member to the pivotal member having a polygonal head within said recess, and a member detachably secured to the head of said bolt having a portion provided with a polygonal interior face engaging the bolt head and a tapering polygonal exterior face engaging said recess in the pivot member.

7. In a pivot construction, the combination with a pivotal member and a support therefor, of a pivot member carried by and laterally projecting from the pivotal member, a bolt securing the pivot member to the pivotal member and having a polygonal head, and a finishing piece covering the joint between the pivotal member and said support non-rotatively engaged with the pivot member and having a polygonal opening corresponding in shape to the head of said bolt and restraining the latter from rotation.

8. In a pivot construction, the combination with a pivotal member and a support therefor, of a pivot element secured to said pivotal member and journaled within said support, a bolt axially engaging said pivot element and securing the same to the pivotal member, and a finishing piece embracing a portion of said bolt within said pivot element and restraining the said bolt from rotation.

9. In a pivot construction, the combination with a pivotal member and a support therefor, of a pivot element secured to said pivotal member and journaled within said support, a bolt axially engaging said pivot element and securing the same to the pivotal member, said bolt having a hexagonal head disposed within said pivot element, and a finishing piece having a hexagonal socket engaging the head of said bolt and restraining the said bolt from rotation.

10. In a pivot construction, the combination with a pivotal member and a support therefor, of a pivot element secured to said pivotal member and journaled within said support, a bolt axially engaging said pivot element and securing the same to said pivotal member, and a finishing piece concealing said bolt and pivot element, said finishing piece having a portion extending within said pivot element and non-rotatively engaged with said bolt and having another portion non-rotatively engaged with said pivot element.

In testimony whereof I affix my signature.

HALSTEAD H. SEELEY.